United States Patent
Raaf

(10) Patent No.: US 9,515,792 B2
(45) Date of Patent: Dec. 6, 2016

(54) NETWORK ELEMENT AND METHOD OF OPERATING A NETWORK ELEMENT

(75) Inventor: Bernhard Raaf, Neuried (DE)

(73) Assignee: Nokia Solutions and Networks Oy, Espoo (FI)

( * ) Notice: Subject to any disclaimer, the term of this patent is extended or adjusted under 35 U.S.C. 154(b) by 1204 days.

(21) Appl. No.: 13/119,502

(22) PCT Filed: Sep. 19, 2008

(86) PCT No.: PCT/EP2008/062508
§ 371 (c)(1),
(2), (4) Date: Mar. 17, 2011

(87) PCT Pub. No.: WO2010/031439
PCT Pub. Date: Mar. 25, 2010

(65) Prior Publication Data
US 2011/0170475 A1    Jul. 14, 2011

(51) Int. Cl.
| | | |
|---|---|---|
| *H04H 1/00* | (2006.01) | |
| *H04L 5/00* | (2006.01) | |
| *H04B 7/155* | (2006.01) | |
| *H04L 5/14* | (2006.01) | |

(52) U.S. Cl.
CPC ......... *H04L 5/0037* (2013.01); *H04B 7/15542* (2013.01); *H04L 5/005* (2013.01); *H04L 5/0051* (2013.01); *H04L 5/0053* (2013.01); *H04L 5/1469* (2013.01); *H04L 5/0044* (2013.01); *H04L 5/0091* (2013.01); *H04L 5/0094* (2013.01)

(58) Field of Classification Search
CPC .... H04B 7/15542; H04L 5/0037; H04L 5/005; H04L 5/1469; H04L 5/0053; H04L 5/0051; H04L 5/0044; H04L 5/0094; H04L 5/0091
USPC ............. 370/312, 315, 350; 455/67.1, 277.1
See application file for complete search history.

(56) References Cited

U.S. PATENT DOCUMENTS

| | | | | |
|---|---|---|---|---|
| 8,547,896 B2 * | 10/2013 | Park | ....................... | H04B 7/155 370/208 |
| 8,660,059 B2 * | 2/2014 | Deng | .................... | H04W 88/04 370/274 |
| 2003/0185170 A1 * | 10/2003 | Allen et al. | .................. | 370/329 |

(Continued)

FOREIGN PATENT DOCUMENTS

| | | |
|---|---|---|
| CN | 1631015 A | 6/2005 |
| EP | 1 916 782 A1 | 10/2006 |

(Continued)

OTHER PUBLICATIONS

U.S. Appl. No. 61/080,025, filed Jul. 11, 2008.*

(Continued)

*Primary Examiner* — Chuong T Ho
(74) *Attorney, Agent, or Firm* — Harrington & Smith

(57) ABSTRACT

The exemplary embodiments of the invention provide at least a method and apparatus to adapt a network element (201, 203) for a communication network (200), wherein the network element (201, 203) is adapted to switch between a first state and a second state to the first state during a subframe (303) of a communication in the communication network (200). Further, in accordance with the exemplary embodiments there is at least a method and apparatus to adapt a network element (201, 203) to receive signals during the second state and transmit signals during the first state.

11 Claims, 7 Drawing Sheets

(56) References Cited

U.S. PATENT DOCUMENTS

| | | | |
|---|---|---|---|
| 2008/0144612 A1 | 6/2008 | Honkasalo et al. | 370/370 |
| 2008/0186950 A1* | 8/2008 | Zhu et al. | 370/350 |
| 2008/0227386 A1 | 9/2008 | Dayal et al. | |
| 2009/0161528 A1* | 6/2009 | Vaidya et al. | 370/203 |
| 2009/0225879 A1* | 9/2009 | Kloos et al. | 375/260 |
| 2009/0312008 A1* | 12/2009 | Lindoff et al. | 455/423 |
| 2009/0318089 A1* | 12/2009 | Stratford et al. | 455/67.11 |
| 2010/0008282 A1* | 1/2010 | Bhattad et al. | 370/312 |
| 2010/0041341 A1* | 2/2010 | Stratford | 455/67.14 |
| 2010/0118706 A1* | 5/2010 | Parkvall et al. | 370/241 |
| 2010/0329107 A1* | 12/2010 | Yuk et al. | 370/208 |
| 2012/0281614 A1* | 11/2012 | Deng | H04W 88/04 370/315 |
| 2013/0114546 A1* | 5/2013 | Stanwood et al. | 370/329 |

FOREIGN PATENT DOCUMENTS

| | | |
|---|---|---|
| EP | 1 848 165 A2 | 10/2007 |
| EP | 1 915 005 A2 | 4/2008 |
| GB | 2438010 A | 11/2007 |
| JP | 2007184935 A | 7/2007 |
| JP | 2008104195 A | 5/2008 |
| JP | 2009533943 A | 9/2009 |
| WO | WO 2007/120023 A1 | 10/2007 |
| WO | WO 2008/115827 A2 | 9/2008 |

OTHER PUBLICATIONS

R1-080323, 3GPP TSG RAN WG1 Meeting #51bis, Sevilla, Spain, Jan. 14-18, 2008, "UL-DL patterns for LTE TDD 5ms and 10ms periodicity", 2 pgs.

R1-080898, 3GPP TSG-RAN WG1 Meeting #52, Sorrento, Italy, Feb. 11-15, 2008, 57 pgs.

R1-084325; Nokia Siemens Networks, Nokia; "Backward compatible implementation of Relaying"; 3GPP TSG RAN WG1 Meeting #55; Prague, Czech Republic, Nov. 10-14, 2008.

Christian Hoymann, et al.; "Relaying Operation in 3GPP LTE: Challenges and Solutions"; LTE-Advanced and 4G Wireless Communications; IEEE Communications Magazine • Feb. 2012; pp. 156-162.

\* cited by examiner

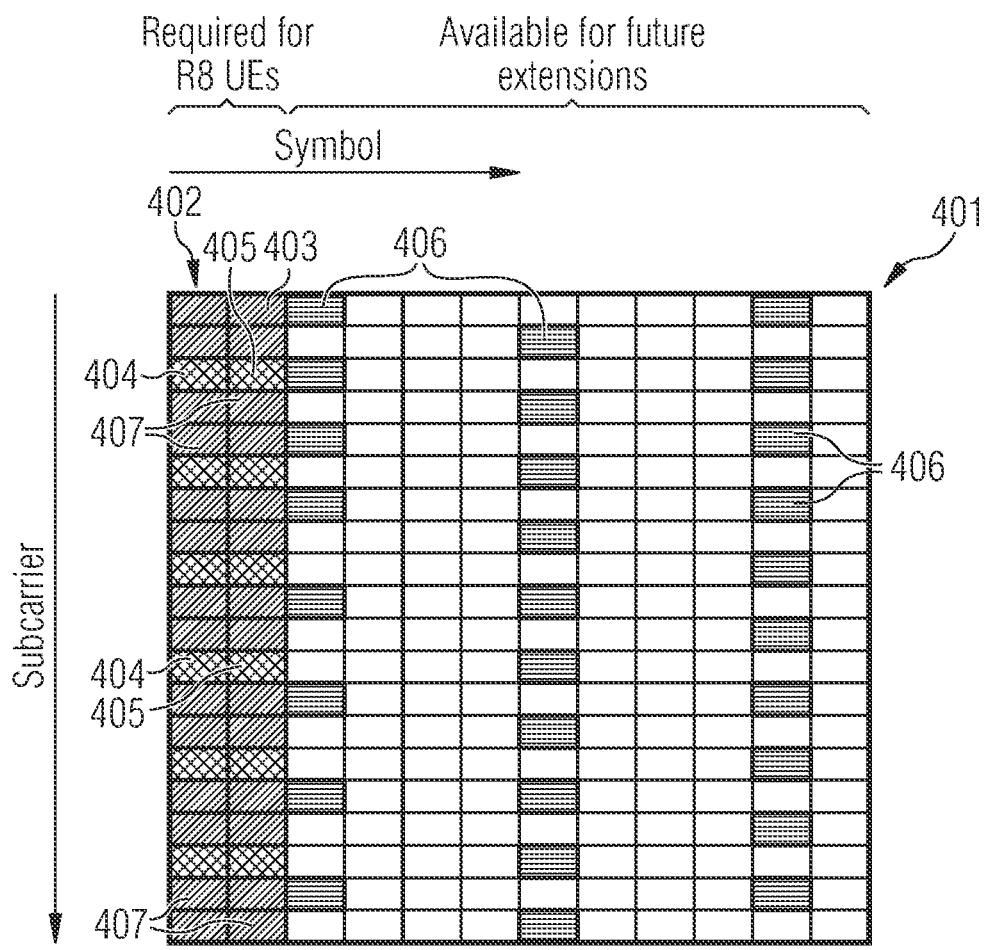

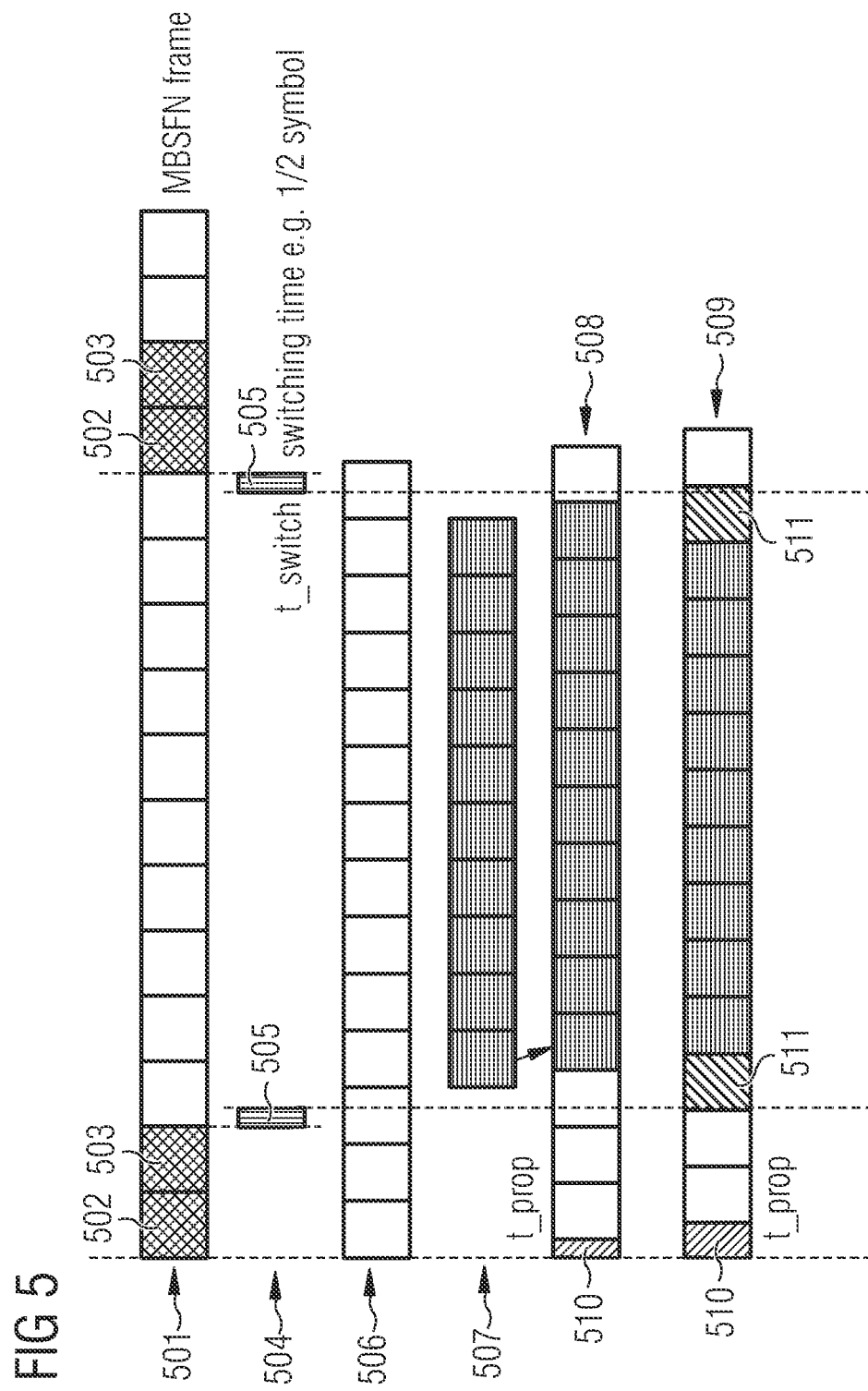

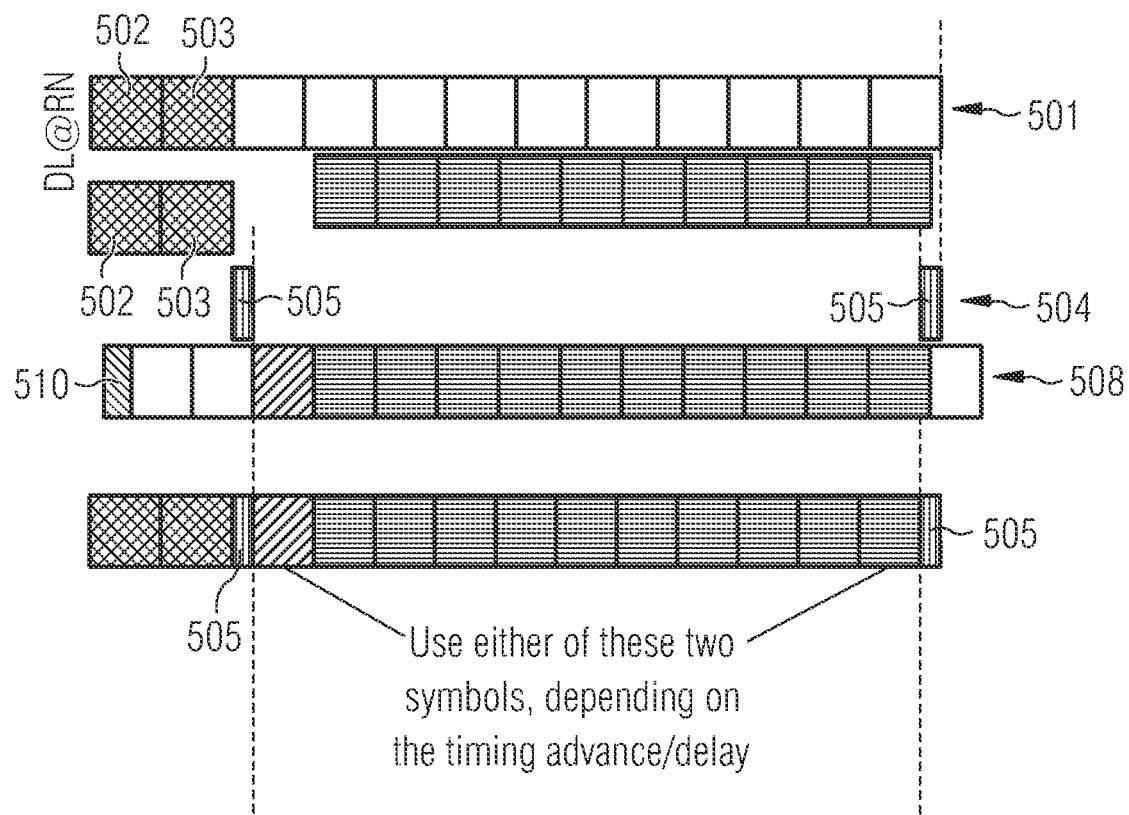

Intentionally shift RN & eNB timing by propagation time+switch time

NETWORK ELEMENT AND METHOD OF
OPERATING A NETWORK ELEMENT

FIELD OF INVENTION

The present invention relates to the field of network elements, in particular to network elements of a cellular communication network. Furthermore, the invention relates to a method of operating a network element.

ART BACKGROUND

For cellular systems like LTE multihop relay nodes are considered for range extension and capacity enhancement, e.g. by signal to noise Ratio (SNR) improvement. According to some proposals relaying networks seem to be an option for broadband wireless data networks like LTE, e.g. for LTE R9 or LTE-A.

For frequency division duplex (FDD) systems an additional time division multiplexing (TDM) structure, for example on subframe basis, may be a suitable relying protocol on layer 2, as it allows for orthogonal transmissions on nodeB—relaying node (NB-RN) and RN—user equipment (RN-UE) links. In the resulting duplex scheme the RN is either connected to the NB or to its attached UEs. In the first case the RN provides UE functionality to the NB and in the second case NB functionality to the UEs.

The basic scheme of such a band structure of a relaying network is schematically depicted in FIG. 1. In the downlink band 101 a relay node (RN) transmits signals to a user equipment (UE) in a first subframe 102 and a nodeB (NB) will transmit signals to the UE or the RN in a second subframe 103. In the uplink band 104 the RN receives signals from the UE in one subframe 105 and the NB will receive signals from the UE or the RN in the next subframe 106. Between the downlink band 101 and the uplink band 104 a duplex gap 107 is present which separates the both in frequencies, which separation in frequencies is schematically depicted by coordinate system 108.

However, there may be a need for a network element and a method of operating a network element which allows an improved performance, in particular which may enable a relaying solution while using LTE R8 conform user equipments.

SUMMARY OF THE INVENTION

This need may be met by a network element, a method of operating a network element, a program element, and a computer-readable medium according to the independent claims. Further embodiments of the present invention are described by the dependent claims.

According to an exemplary aspect of the invention a network element is provided wherein the network element is adapted to switch between a first state and a second state different to the first state during a subframe of a communication in the communication network.

The term "subframe" may particularly denote a part of a frame defining a specific time period of a communication. The lengths and layout of such frames are typically defined in the context of different networks, e.g. in the context of LTE networks. A subframe may comprise several symbols while several subframes are included in a frame. In specific cases a subframe may correspond to a resource block. In general a subframe may have a length in time of 1 millisecond.

According to an exemplary aspect a method of operating a network element is provided, wherein the method comprises receiving signals during the second state, and transmitting signals during the first state. In particular, the received signals may be data signals which may be received during a predetermined sequence of symbols while the transmitted signals may be reference signals which are transmitted during the rest of the symbols of the subframe.

According to an exemplary aspect a program element is provided, which, when being executed by a processor, is adapted to control or carry out a method according to an exemplary aspect of the invention.

According to an exemplary embodiment a computer-readable medium, in which a computer program is stored which, when being executed by a processor, is adapted to control or carry out a method according to an exemplary aspect of the invention.

By providing a network element which is able to switch between two states during a single subframe it may be possible to avoid problems arising due to the fact that a network element may not be in a transmitting state and a receiving state at the same time with respect to one specific communication, e.g. in a specific frequency band i.e. uplink or downlink. That is, in general a relay node, for example, may at one point in time only be in receiving mode or in transmitting mode but not in both on any particular frequency band i.e. both in the uplink and downlink frequency band. Otherwise the relay node may not be able to receive weak signals correctly, given that it transmits on the same frequency and this transmission is much stronger at the location of the relay node than the received signal, e.g. several Watts compared to $10^{-33}$ Watts or e.g. 30 dBm transmit power and −100 dBm reception power. The strong transmit signal may then make it virtually impossible to receive the weak reception signal. However, a switching of a relay node, for example, may enable that user equipments are used which demands the presence of reference signals in each subframe in order to perform a channel estimation. Thus, it may be possible to use simple known user equipments even in a relaying communication network which averages reference signals of subsequent subframes in order to perform the cannel estimation. Such an averaging (or at higher speeds interpolation) may enable the user equipment to make a better estimate of the channels impulse response and thus also may allow a more accurate detection of the transmitted data. However, if some reference signals have not been sent then a deterioration of the reception may be caused.

A gist of an exemplary aspect of the invention may be seen in the providing of network elements which are able to switch between two different states during a single subframe which, according to communication protocols, are used either for transmitting or receiving. For example, during a subframe which is, according to a used protocol or communication scheme, used for transmitting some symbols of the frame may be used to perform a receiving action.

Next, further exemplary embodiments of the network element are described. However, these embodiments also apply to the method of operating a network element, the program element, and the computer-readable medium.

According to another exemplary embodiment of the network element the network element is a relay node comprising a transmitting unit and a receiving unit, wherein the first state is a transmitting state in which the relay node transmits signals by using the transmitting unit, and wherein the second state is a receiving state in which the relay node receives signals by using the receiving unit.

That is, the relay node may be adapted to switch between receiving and transmitting mode in one single subframe while using a frequency division duplex procedure. For example, during the time periods associated to some symbols of a single subframe the relay node may be in receiving mode while during the time periods associated with the other symbols of the single subframe the relay node may be in transmitting mode. However, one or several symbols may also be used for switching between the two modes.

According to another exemplary embodiment of the network element during the transmitting state reference signals are transmitted and/or during the receiving state data signals are received.

The term "reference signals" may particularly denote signals which are transmitted in order to enable a channel estimation based on the received quality of the reference signals.

According to another exemplary embodiment of the network element the subframe is an MBSFN subframe.

In particular, the MBSFN subframe may comprise a predetermined number of symbols, e.g. twelve symbols. That is, an MBSFN subframe may be included in an LTE R8 scheme or protocol having 14 symbols, for example, or any other suitable number of symbols. According to the MBSFN scheme the first one or two symbols of a subframe are reserved for or intended to transmit control information and/or may be used to transmit reference signals. In particular, a user equipment using the MBSFN scheme or protocol may only assume to receive control or reference signals for channel estimation during the first symbols. Thus, a switching between a first state, e.g. transmitting state of a relay node in downlink, and the second state, e.g. receiving state of the relay node in downlink, may only be necessary once per subframe which may lead to an improved performance, since the total amount of time wasted for switching may be reduced. In particular, when using other subframes than MBSFN subframes it may be necessary to switch more often than once.

According to another exemplary embodiment of the network element the network element is adapted to be in the first state during the beginning of the subframe.

In particular, the first state may be a transmitting state and the network element may be adapted to transmit reference signals and/or control signals during at least the beginning of the subframe in particular of each (MBSFN) subframe. For example, the network element, e.g. a relay node, may be in the first state for the first, second, and/or third symbols.

According to another exemplary embodiment of the network element the network element is adapted to determine a point in time for switching between the first and the second state depending on a propagation delay between a nodeB and the network element.

In particular, the switching may be performed either in such a way that during the whole third symbol of the subframe the network element is in the second state, or at a point in time during the third symbol of the subframe the network element. The network element may be a relay node of the communication network.

According to another exemplary embodiment of the network element the communication network is an LTE R8 relaying network using a subframe of predetermined length, wherein the switching is performed at a predetermined point in time during the subframe.

According to another exemplary embodiment of the network element the predetermined point in time is in the interval of $2/14$ to $3/14$ of the predetermined length, or in the interval of $3/14$ to $4/14$ of the predetermined length.

In particular, the choosing of the point in time may be based on a propagation delay between two network elements in the communication network, e.g. between a nodeB and a relay node, for a downlink or even an uplink communication. For example, the LTE R8 scheme generally used may comprise a subframe having 14 symbols, while according to an exemplary aspect of the invention an MBSFN subframe may be used as the subframe during which a switching between two states is performed. In such a case the network element, e.g. relay node, may be in the second state during the $4^{th}$ to $13^{th}$ symbol of the generally used subframe or during the $3^{rd}$ to $14^{th}$ symbol depending on the propagation delay. The base station may then take care of the transmitting of the information to the RN in the corresponding symbols of the OFDM symbol that it transmits.

According to another exemplary embodiment of the network element the switching is performed at a point in time, which point in time is calculated in such a way that the ratio between the time in the first state and the time in the second state during the subframe is optimized, in particular minimized.

In particular, the first state may be a transmitting state and the second state may be a receiving state. Thus, the point of switching may be chosen so that the network element, e.g. a relay node, is in the receiving state as long as possible, while it is still enabled to transmit some symbols, e.g. containing control or reference signals, to another network element, e.g. a user equipment. For example, the optimal switching point in time may depend on the propagation delay between the network element, e.g. relay node, and another network element, e.g. a base station or nodeB.

According to another exemplary embodiment of the network element the ratio is minimized by disaligning the timing of the network element with respect to the timing of another network element.

In particular, the network element may be a relay node and the another network element may be a nodeB. Thus, by deliberately disaligning the timing it may be possible to achieve a better frame efficiency concerning a receiving of the relay node by ensuring that the switching to the first state, e.g. transmitting state, is performable at reception windows of a third network element, e.g. a user equipment. Therefore, the time available for communication may be maximized. That is, basically the relay node timing may be shifted so that OFDM symbols or reference symbols to be received by the user equipment fall exactly into the reception window of the user equipment.

It should be noted that while the above description mainly relates to distinct states of a first network element, e.g. a relay node, the network element may also be a base station. In that case these distinct states relates to a communication link to a single other network element, while for a communication to another network element the first network element may be in another state. For example, a base station may be in the transmitting state with respect to a specific user equipment (UE) or relay node (RN) while with respect to another UE or RN it may be in a silent or receiving state. Of course the communication network may comprise a plurality of base stations, relay nodes and/or user equipments, wherein each or at least some of these elements are network elements according to an exemplary aspect of the invention.

Summarizing an exemplary aspect of the invention may be seen in providing a relay node for a LTE R8 relaying network which is adapted to enable the use of common user equipments demanding the presence of reference signals in each subframe. For enabling the use of such UEs the relay node may be adapted to perform a switching between transmitting mode and receiving mode once during a single subframe. Thus, it may be possible to omit the necessity to provide a relay node which can simultaneously receive and transmit signals which will lead to a feedback loop over the air. In particular, the relay node and/or the UEs may be adapted to receive/transmit MBSFN subframes including 12 symbols wherein the first one or two symbols may be reserved for control signals, but which may be used also for the purpose of transmitting reference signals from the relay node to the UE. The use of MBSFN subframes may be particular advantageous since in this way it may be achievable that the RN may only switch once between transmitting mode and receiving mode and back during a subframe so that the performance may be increased. Since switching may not be done instantaneous, e.g. transmission power cannot be switched off instantaneously as this might cause switching transients, instead power may be reduced gradually and also protection circuitry that protects the receiver during the transmission may need some time to be activated and deactivated, a reducing of switching processes in particular a reduction of the number of times a switching needs to be done during a subframe may reduce time wasting and thus increase the performance of the communication.

In case of frequency division duplexing (FDD) systems the frequency duplex bands for up- and downlink (UL/DL) have to change when the RN is switching between UE and NB functionality. Thus, in all subframes where the RN is listening to the NB messages it will not be able to broadcast the scattered reference signals for channel estimation as defined in LTE R8. A switching performed during a single subframe may omit at least some of the problems which would arise when switching is performed only on subframes borders, i.e. at the beginning and end of a subframe. In particular, UEs using techniques averaging reference signals (RSs) from adjacent subframes in order to estimate channel performances may still be suitable to operate together with a relay node according to an exemplary aspect of the invention in a relaying network.

Thus, a network element, e.g. a relay node, according to an exemplary aspect of the invention may enable a FDD relaying solution which can serve LTE R8 conform UEs. This may in particular beneficial to allow LTE R8 conform user equipments, that interpolate or average over several reference signals or in general derive channel information from reference signals in multiple subframes.

In particular, it should be noted that one specific aspect of the invention may be based on the basic idea to use the so called MBSFN frame which is anticipated in R8 to be used for MBSFN transmission from several enhanced nodeBs (eNBs) to UEs, but this frame is not fully specified in R8, instead the specification will be deferred to a later release. It may however be specified in R8, that some part of the MBSFN subframe will be used for such a transmission and is therefore not available for the UE to make measurements or channel estimations. Instead, at the beginning of the MBSFN subframe there are 1 or 2 OFDM symbols that contain both cell specific reference signals and control signalling. The MBSFN frame can be utilized either for MBSFN transmission (then the detailed frame structure of the subsequent symbols is not yet defined and R8 UEs will simply ignore that part) or it can be used for normal R8 conform transmission of point to point transmission, then the control channel signalling will indicate which UEs are scheduled in that frame and on which resources. Only in the latter case additional reference symbols may be transmitted also from the RN. The control signalling may also be used to indicate uplink resources to be used for subsequent uplink data transmission, or transmit ACK/NACK signals in response to previous uplink data transmissions.

It has to be noted that embodiments of the invention have been described with reference to different subject matters. In particular, some embodiments and aspects have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered to be disclosed within this application.

The aspects and exemplary embodiments defined above and further aspects of the invention are apparent from the example of embodiment to be described hereinafter and are explained with reference to these examples of embodiment.

BRIEF DESCRIPTION OF THE DRAWINGS

FIG. 4 schematically shows a structure of a MBSFN subframe.

FIG. 5 schematically shows the use of a MBSFN subframe according to an exemplary embodiment of the invention.

FIG. 6 schematically shows a worst case shift for relaying.

DETAILED DESCRIPTION

Figure 1:
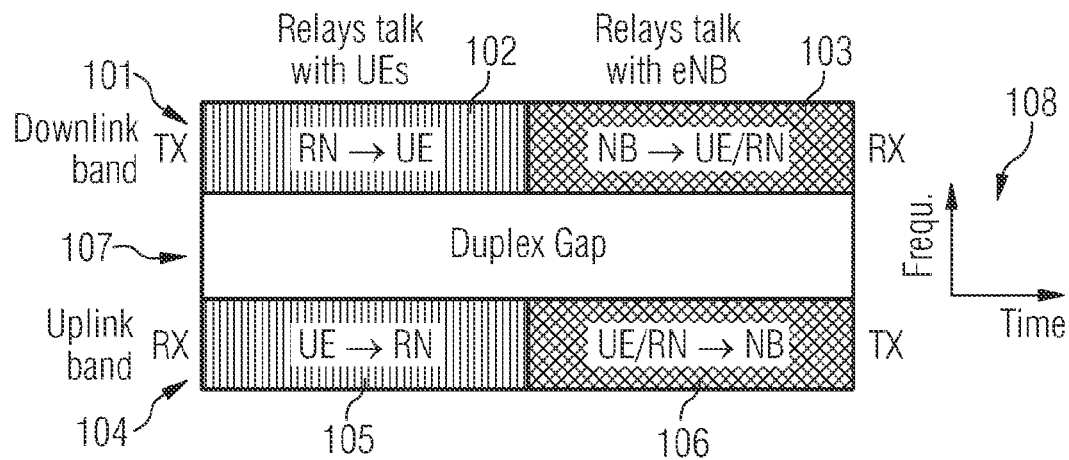
FIG. 1 schematically shows a band structure of a relaying network.

The illustration in the drawings is schematic. It is noted that in different figures, similar or identical elements are provided with the similar or identical reference signs.

Figure 2:
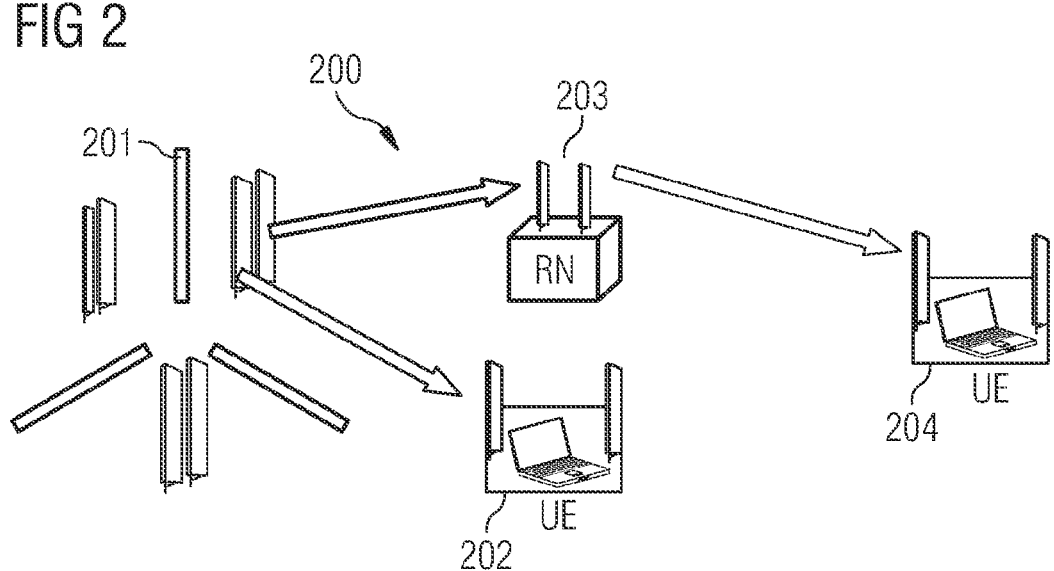
FIG. 2 schematically shows a basic relaying concept.

With reference to FIGS. 2 and 3 some basics of a relaying network will be described which may be useful for understanding exemplary embodiments of the invention.

FIG. 2 depicts the basic relaying concept in a communication network 200 with a nodeB (NB) 201 supporting own user equipments (UEs) 202 in parallel to the relay node (RN) 203, which in turn serves its own UEs 204. As we assume a LTE system, OFDMA allows a NB to support UEs and RNs in parallel on different resource blocks (RBs), i.e. on some RBs the NB transmits data to UEs and on other RNs it transmits data to RNs.

In FDD systems the RN has intermittently to listen and to transmit on the same duplex frequency band, i.e. has to switch between receive and transmit mode. It should be noted that simultaneous transmission and reception at the RNs (direct repeater) may not be suitable due to its restricted applicability and difficult feedback instabilities.

Figure 3A:
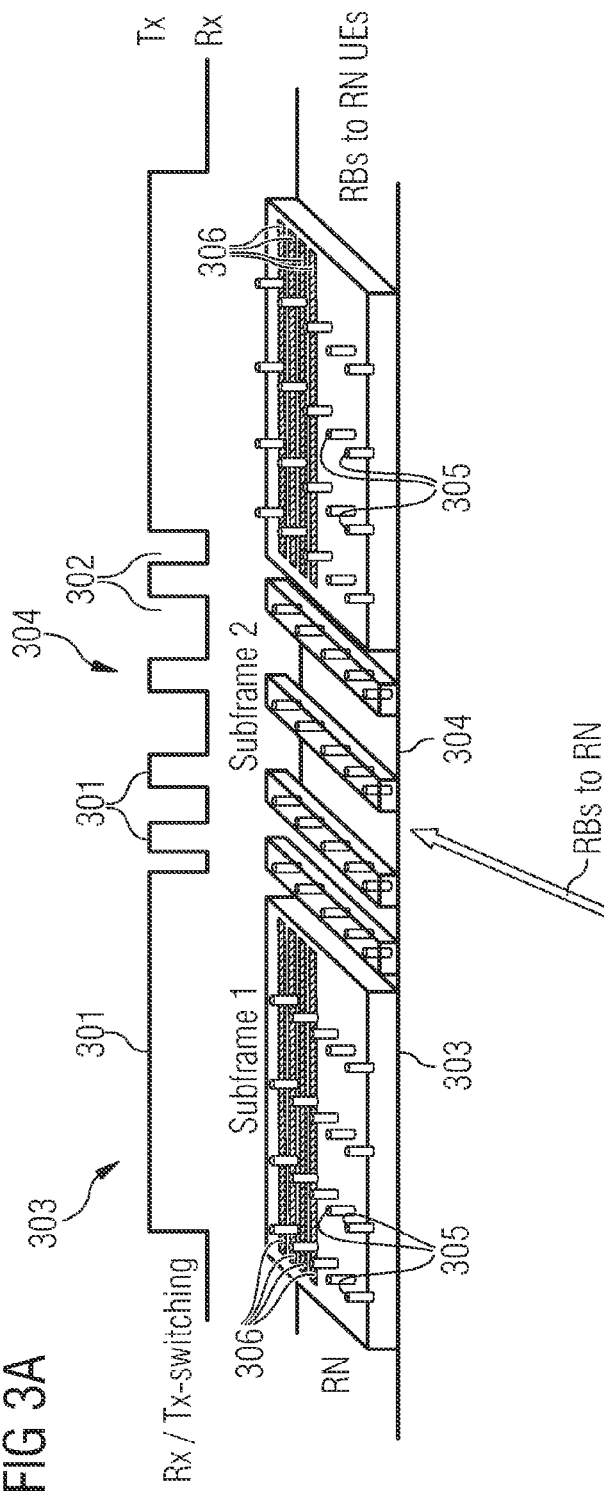
FIG. 3 schematically shows a R8 conform relaying solution.

FIG. 3 schematically shows a R8 conform relaying solution. A basic idea of this exemplary embodiment of the invention may be clear from FIG. 3, where the RN is switched within a subframe several times between Rx- and Tx-mode. In particular, the FIG. 3A shows schematically the switching between transmitting states 301 and receiving states 302 for a relay node, wherein in a first subframe 303 the relay node is in transmitting state, while in a second subframe 304 the switching is performed. In the bottom part of FIG. 3A the downlink band is shown in a schematically two dimensional form in order to show that in each subframe different frequencies may be used for transmitting and receiving, i.e. a plurality of frequencies may be used for the communication. Poles 305 are indicating reference signals transmitted from the RN to UEs. The hatched bands 306 indicate the transmission of data (RBs) from the RN to its UEs).

Figure 3B:
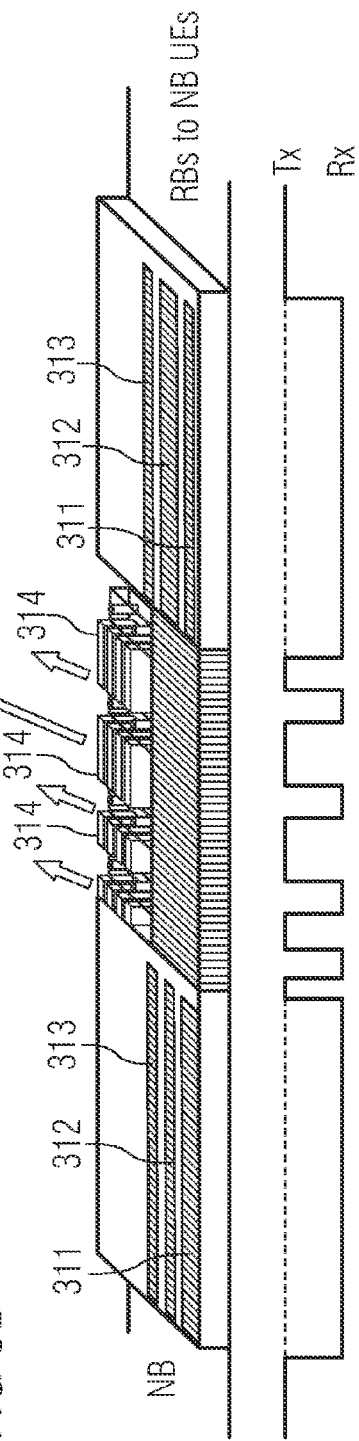

In FIG. 3B the communication scheme between a nodeB and its UEs and RN is schematically depicted which scheme may be implemented. In this implementation some specific RB formats are used, where no data are transmitted on the OFDM symbols carrying RSs, i.e. symbol 2, 6, 9 and 13. This may allow for data transmission from NB to its attached UEs on not used resources, but this feature is optional, as the NB might send full RBs as well to its UEs. If RSs from NB and RN are orthogonal—and for a proper relaying solution this would be advantageous—there may be no need for the NB to stop data transmission to its UEs on RBs not intended for data transfer to the RN. The data transmission (RBs) from NB to its UEs is schematically depicted in FIG. 3B by the continuous hatched bands 311, 312, and 313, while the transmission of data (RBs) from the NB to the RN is indicated by the columns 314 in FIG. 3B.

The switching allows the RN to transmit RSs signals in those four symbols of the subframe which contain RSs according to LTE R8, namely symbols 2, 6, 9, and 13.

For those symbols, where the RN is in transmit mode the NB may stop transmission of data to the RN. So instead of RBs of length 14 symbols the NB will send several data packets of shorter length to the RN. Therefore the NB-RN may not longer support LTE conform transmission according to the definition of RBs, but will be proprietary, which may be of small importance compared to a proprietary radio interface to the UEs. The latter interface should be maintained, otherwise legacy UEs may not be used in a relay enhanced network. However, base stations may typically be equipped with a software update, so that it is feasible to implement changes on the link from the BS to RN.

For symbols containing RSs the NB will have to stop data transmission to the RN. The unused subcarriers (SCs) for these symbols may not be used for data transmission to UEs as UEs always expect RBs of length 14 symbols.

FIG. 4 schematically shows a structure of a MBSFN subframe 401 for a number of subcarriers including a plurality of symbols. In FIG. 4 each symbol is represented by one of the depicted rectangles. In detail the first two OFDM symbols 402 and 403 may be used for reference symbols and/or control symbols. Actually, if only two antennas are used at the RN the configuration using only one OFDM symbol for this purpose may be possible as well and may be more reasonable to be used for a RN. The symbols three to twelve are available for future extensions and may be used by a RN according to an exemplary embodiment of the invention for receiving data from a nodeB or base station. In particular, the symbols 404 and 405 may be used for cell-specific reference signals of antenna n of the RN, while the symbols labelled 406 may be used for cell-common reference signals. Furthermore, the symbols marked 407 may correspond to unicast L1/L2 control channel. It should be noted that in the nomenclature of the application an OFDM symbol is itself composed of several symbols on the different subcarriers. These symbols are depicted as small rectangles in FIG. 4, while an OFDM symbol is represented by a column consisting of such symbols. Several OFDM symbols then constitute a subframe, such a subframe is shown in FIG. 4.

As already mentioned, a basic idea of an exemplary embodiment of this invention may be to use the OFDM symbols that are specified in R8 to be used for MBSFN (but not yet fully specified how exactly an MBSFN transmission looks like) to switch the RN into reception mode from the eNB. The R8 UEs may "think" that at this time some MBSFN transmission with low power takes place and not make any use of the signals transmitted there, as it was not specified how it looks like.

FIG. 5 schematically shows the use of a MBSFN subframe according to an exemplary embodiment of the invention. In particular FIG. 5 shows in the top line 501 an MBSFN subframe that is used by the relay in down link (DL). The cross hashed symbols 502 and 503 are the OFDM symbols that contain reference signals and control signals. For the case of 4 antennas 2 symbols are used, if only one symbol is used then more space is left for the transmission between Relay and eNB. The cross hashed symbols at right already belong to the next subframe, which may be a MBSFN frame as well, but can also be a normal subframe. It should be noted that for MBSFN a longer cyclic prefix (CP) may be used, in order to allow combining of signals from several, possibly distant base stations. This is shown in this FIG. 5 and therefore the width of the OFDM symbols of the MBSFN subframe is a little wider than the width of ordinary OFDM symbols. However, the invention may also be applied if ordinary OFDM symbols are used for the MBSFN subframe. The advantage of the latter approach may be that then less time needs to be spent to transmit the aforementioned two (or one) first OFDM symbol(s) and more time is available for transmission form the base station to the RN or for switching.

In the second line 504 the switching time 505 is depicted, which is assumed here to be symbol.

In the third line 506 the symbol timing at the BS is shown, assuming that the BS uses the ordinary CP.

In the $4^{th}$ line 507 the symbols that can be used for relaying, i.e. the relay link between BS and UE can be used, are depicted. 10 out of 14 symbols can be used, giving an efficiency of about 71%. However, as the first three symbols contain mostly control signalling, actually only 11 symbols are available for payload anyhow, so the actual efficiency is something like 10/11=91% (actually slightly less because some control signalling may be needed for the relay link as well, but much less because less relays need to be multiplexed and the link characteristics don't change so fast).

In the $5^{th}$ line 508 the timing of the subframe at the location of the relay is depicted, which is delayed by the propagation time it takes a signal to travel from the base station to the RN in this example by symbol, but this is still within the reception window of the RN.

In the $6^{th}$ line 509 the timing of the subframe at the location of the relay is depicted, assuming a bigger delay labelled t_prop (propagation time) 510 in FIG. 5. In this example, the delay is so big that only 9 symbols fall within the reception window of the RN, as the last symbol (hatched) 511 overlaps with the switching time. Also the third symbol (also hatched) 511 cannot be used, because it still overlaps with the first switching period.

However, it may be possible to receive these symbols as well when using some specific solutions some of which are explained in the following.

FIG. 6 schematically shows a worst case time shift due to propagation delay for relaying. The same reference signs as in FIG. 5 are used for the same elements. FIG. 6 does show that if the switching time 505 is $\frac{1}{3}^{rd}$ OFDM symbol, in all cases 10 symbols may be used, no matter what the timing advance is. For large timing advances the 13$^{th}$ symbol transmitted by the eNB cannot be received any more, but then the third symbol can be received (it now falls into the reception window due to the propagation delay). One solution for increasing the relaying time may be to switch from using symbols 4-13 for receiving to using 3-13 depending on the propagation delay. In particular, the subframe may have a time length of 1 ms and may be divided into 12 symbols as defined by the MBSFN schema. The first two symbols are reserved for controlling and reference signals and corresponding to $\frac{2}{12}$ ms. For ensuring that $\frac{11}{14}$ of the subframe are usable for relaying the switching time may be about 0.024 ms corresponding to a third of a symbol length or $\frac{1}{42}$ of the total subframe.

Figure 7:
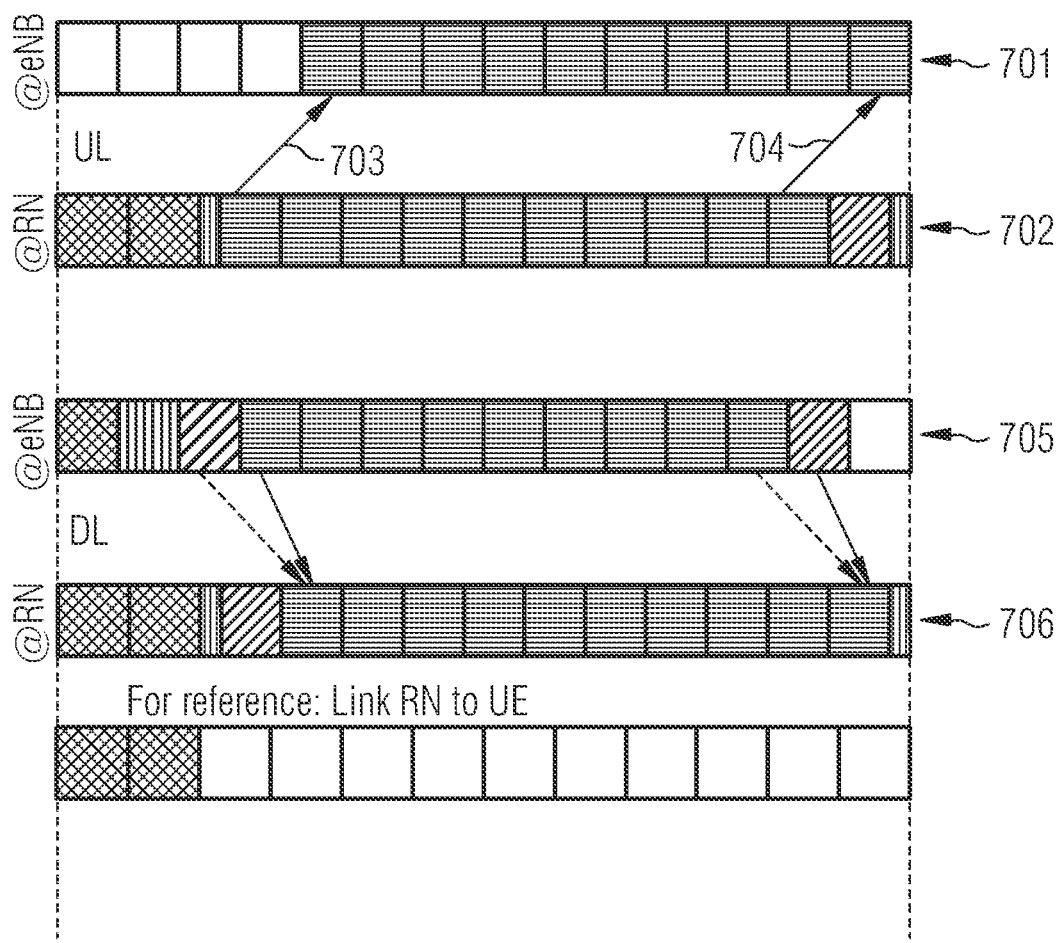
FIG. 7 schematically shows the maximum allowable timing advance for an exemplary embodiment.

FIG. 7 schematically shows the maximum allowable timing advance for a switching time of $\frac{1}{3}$ of a symbol. It should be noted that the timing advance and thus the possible distance between network elements, e.g. base station and relaying node, may be increased by sacrificing symbols. In particular, FIG. 7 shows in the first two lines 701 and 702 the uplink communication at the nodeB and the RN, respectively. For uplink connection up to 4/3 symbols corresponding to 28 km may be sacrificed, which is indicated by the arrows 703 and 704, while still ensuring that 10 symbols may be used for relaying. For greater distances additional symbols may be sacrificed, particularly one additional symbol for each 21.4 km.

Furthermore, FIG. 7 shows in the next two lines 705 and 706 the downlink communication for nodeB and RN, respectively. When using 3 symbols for PDSCH a timing advance up to $\frac{2}{3}$ symbols may be used corresponding to a distance of about 14 km while when using 2 symbols for PDSCH a timing advance up to 5/3 symbols may be used corresponding to a distance of about 35 km. It should be noted that for smaller cells the restriction for t_switch to be $\frac{1}{3}$ of a symbol may be relaxed, i.e. also a longer switching time is possible without having to sacrifice additional symbols and thus allowing an easier implementation of the RN.

Figure 8:
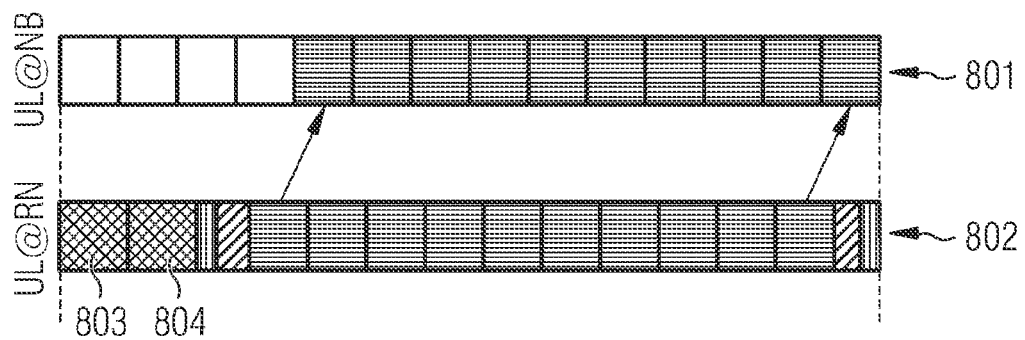
FIG. 8 schematically illustrates a calculation of relay frame efficiency.

FIG. 8 schematically illustrates a calculation of relay frame efficiency. In particular, the upper line 801 shows the subframe usage for the uplink communication at a nodeB ensuring that 10 of 14 symbols may be used for relaying. An eleventh symbol may be used for tuning timing advance/delay between NB and RN shown in the second line 802. Thus, in total only 10 symbols may be used for relaying since the first two symbols 803 and 804 are used for controlling and reference signal transmission, while the advance/delay timing needs one symbol for compensating another symbol wasted due to the advance/delay itself. Thus, an efficiency of about 10/14 or about 71% may be achievable on top of which the common overhead, e.g. CP, guard bands, reference signals etc. may be lost. However, it should be noted that some optimization may be possible to recover some overhead to increase the frame efficiency. For example, less reference signals may be necessary for the link between the RN and the NB in uplink, since the relay link is static and possibly less dispersive. Additionally since there are fewer RNs than UEs the control signalling may cost less overhead as well, i.e. may not cause the loss of 3 of the 10 symbols or slots but may be only need a fraction of one symbol. It may also be possible to code control for several RNs together, as they may all have good channels leading to less blind coding as well. It should be noted as well that as the RN are assumed to have better positions, i.e. arranged at locations ensuring good transmission, even higher modulation schemes may be used for control as well and not only for the data.

Figure 9:
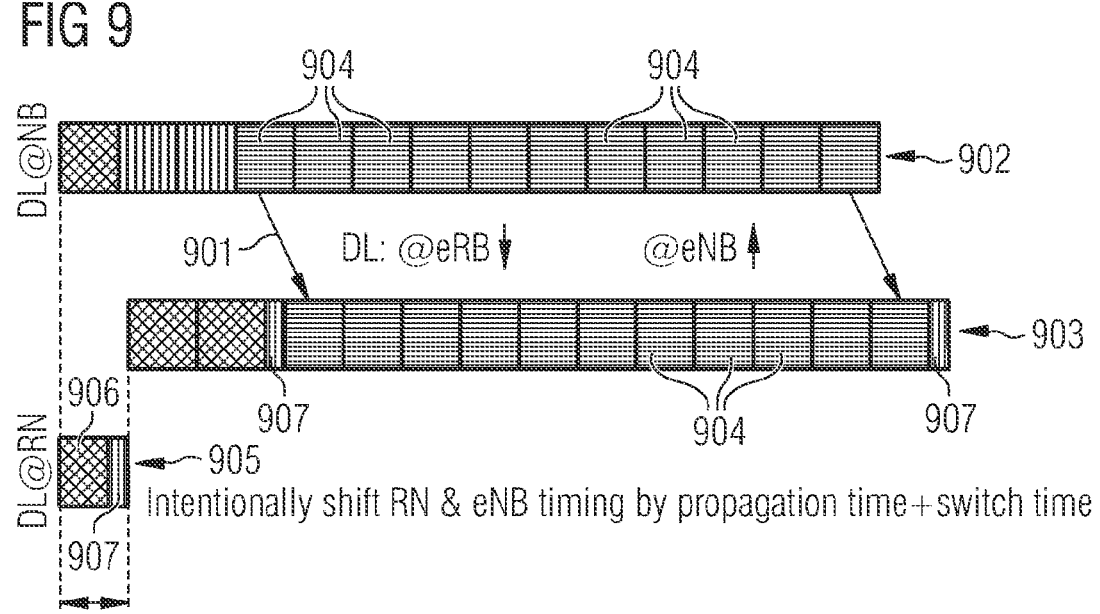
FIG. 9 schematically illustrates an arbitrarily disaligning of the timing.

FIG. 9 schematically illustrates an arbitrarily disalignment of the timing. In particular, FIG. 9 shows a concept to deliberately disalign the timing of the RN and the enhanced nodeB (eNB) in order to get a better frame efficiency. Basically the RN timing is shifted which is indicated by the arrow 901 between the first line 902 corresponding to a downlink communication at the NB and the second line 903 corresponding to the downlink communication at the RN. Due to the deliberately disaligning 11 symbols 904 are available for payload and no symbol may be used for timing advance. The timing advance is compensated by the disalignment instead. In the third line 905 the intentional shift corresponding to the propagation time 906 and the switch time 907 is depicted. Such a disalignment may be performed if RN is not required to be strictly synchronous to mother eNB so that the timing may be tuned to allow 11 symbols in either UL or DL which may boost the bottleneck to about 79% efficiency. If the DL is aligned in this way the entire DL capacity of the cell may be useable, i.e. the eNB may not have to transmit DTX anywhere. The deliberately disalignment of the timing may ensure that the OFDM symbols to be received fall exactly into the reception window of the UE.

The above described concept may also be used in case that an eNB uses a subframe having 12 symbols, i.e. a long CP, as well, e.g. in case the eNB uses MBSFN as well. In case of a propagation delay less than switching time one symbol may be lost on both ends of the subframe in UL and DL. This may correspond to an efficiency of 8/12 or about 67%. However, in case that the propagation time t_prop is greater than switching time t_switch and t_prop is less than the symbol length t_symb-t_switch the efficiency may be 9/12 or 75%. Furthermore, also in this case the eNB and the RN may be deliberately desynchronized as described in connection with FIG. 9.

It should be noted that the principle put forward in this invention may also be used for a TDD network. While in TDD it is in principle possible to have a time division separation for the 4 links for a RN, the requirement that the link to the UE must also support legacy R8 terminals may make it impossible to implement that scheme because the UEs do not anticipate that some subframes are not used for communication between UE and RN. Using the MBSFN subframe is also possible in TDD.

Also it may be possible to specify that an entire frame can be used for relaying i.e. there is no need to transmit any reference signals. Then such frames may be used for relaying, but MBSFN frames with RS transmission only in one or two subframes may still be used to dynamically assigning resources for relay or access link. It might also be possible to introduce a frame that is similar to the MBSFN frames in the sense that there are always some guaranteed reference signals and a control part, but the normal cyclic prefix is used. This may avoid the inefficiency due to the long CP which may typically not be necessary as the frame is not actually used for MBSFN operation.

In this application the use of the second state for relaying has been described in detail. However, the second state may also be used for or may be associated to other purposes including:

Base station to base station communication e.g. to coordinate operation of two base stations.

Base station DTX, i.e. the base station does switch off the transmitter completely for some time (the "rest" of the MBSFN frame), even without switching to receive mode but idling instead. This may be done for any of the following reasons:

- Save energy, since switching TX completely off is typically much more efficient than transmitting with low power as is the case that only the reference signals are transmitted, because several components have to be activated and consume power irrespective of the output power and typically a transmitter, in particular the power amplifier operates inefficiently at a low power level ("green radio").
- Interference reduction or interference coordination. In this case neighboring base station switch off transmission in a coordinated fashion in order to allow operation with greatly reduced interference levels at the cell edge.
- Hierarchical cell deployments, similar to interference co-ordination, but now there may be small base stations within the coverage area of macro base stations in order to provide extra capacity at some hot spots. DTX may be used to allow interference reduction in the border area of these hot spots, or even within. It may e.g. allow a UE to communicate with the macro cell despite it is very close to the hot spot cell and this may be beneficial if the UE travels quickly through the coverage area of the hot-spot so that handover to and later away from the hot spot cell would be inefficient.
- CMIMO or cooperated transmission, where many base stations are transmitting to one UE in a coordinated manner, which is different from R8 and therefore needs to be done outside of R8 frames. In particular to fully benefit from such schemes it may be necessary to also have precise channel knowledge from the neighbor cell and this may only be possible to achieve if the closest cell is powered down on some predetermined time intervals in order to allow better channel estimates from the neighbor cell without interference from the serving cell. At other times the channel from the serving cell may be measured with greater accuracy in the same way
- Any other enhancements that do not work right now with the existing LTE subframe format but need another format to operate efficiently.

Finally, it should be noted that the above-mentioned embodiments illustrate rather then limit the invention, and that those skilled in the art will be capable of designing many alternative embodiments without departing from the scope of the invention as defined by the appended claims. In the claims, any reference signs shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

LIST OF REFERENCE SIGNS

101 Downlink band
102 First subframe
103 Second subframe
104 Uplink band
105 One subframe
106 Next subframe
107 Duplex gap
108 Coordinate system
200 Communication network
201 NodeB
202 User equipment
203 Relay node
204 User equipment
301 Transmitting state
302 Receiving state
303 First subframe
304 Second subframe
305 Reference signals
306 Data transmission
311 Data transmission
312 Data transmission
313 Data transmission
314 Data transmission
401 MBSFN subframe
402 OFDM symbol
403 OFDM symbol
404 Cell-specific reference signals
405 Cell-specific reference signals
406 Cell-common reference signals
407 Unicast L1/L2 control channel
501 MBSFN subframe
502 OFDM symbols
503 OFDM symbols
504 Second line
505 Switching time
506 Third line
507 Fourth line
508 Fifth line
509 Sixth line
510 T_prop
511 Overlapping symbol
701 First line
702 Second line
703 Arrow indicating timing advance
704 Arrow indicating timing advance
705 Third line
706 Fourth line
801 First line
802 Second line
803 OFDM symbol
804 OFDM symbol
901 Arrow indicating shifting
902 First line
903 Second line
904 Data symbols
905 Third line
906 T_prop
907 Switching time

The invention claimed is:

1. A relay node, comprising:
a processor; and
a non-transitory computer-readable medium storing computer program code, where the non-transitory computer-readable medium and the computer program code are configured, with the processor, to cause the relay node to at least:
switch between a first state and a second state different to the first state within a single multicast-broadcast single frequency network subframe of a communication in a communication network, and wherein the relay node comprises: a transmitting unit; and a receiving unit, wherein the first state is a transmitting state in which the relay node transmits signals by using the transmitting unit; and wherein the second state is a receiving state in which the relay node receives signals by using the receiving unit.

2. The relay node according to claim 1, wherein during the transmitting state reference signals are transmitted; and/or wherein during the receiving state data signals are received.

3. The relay node according to claim 1, wherein the relay node is adapted to be in the first state during the beginning of the subframe.

4. The relay node according to claim 3, wherein the relay node is adapted to determine a point in time for switching between the first and the second state depending on a propagation delay between a nodeB and the relay node.

5. The relay node according to claim 1, wherein the communication network is a long term evolution release 8 relaying network using a subframe of predetermined length, wherein the switching is performed at a predetermined point in time.

6. The relay node according to claim 5, wherein the predetermined point in time is in the interval of $2/14$ to $3/14$ of the predetermined length, or in the interval of $3/14$ to $4/14$ of the predetermined length.

7. The relay node according to claim 1, wherein the switching is performed at a point in time, which point in time is calculated in such a way that the ratio between the time in the first state and the time in the second state during the subframe is optimized.

8. The relay node according to claim 7, wherein the ratio is minimized by disaligning the timing of the relay node with respect to the timing of another relay node.

9. A method, comprising:

switching, with a relay node, between a first state and a second state different to the first state within a single multicast-broadcast single frequency network subframe of a communication in a communication network comprising receiving signals during the second state, and transmitting signals during the first state, and wherein the relay node comprises: a transmitting unit; and a receiving unit, wherein the first state is a transmitting state in which the relay node transmits signals by using the transmitting unit; and wherein the second state is a receiving state in which the relay node receives signals by using the receiving unit.

10. A program element, which, when being executed by a processor, is adapted to control or carry out a method according claim 9.

11. A non-transitory computer-readable medium, in which a computer program is stored which, when being executed by a processor, is adapted to control or carry out a method according claim 9.

* * * * *